(12) United States Patent
Russell et al.

(10) Patent No.: US 8,364,431 B2
(45) Date of Patent: Jan. 29, 2013

(54) FIELD DEVICE CALIBRATION

(75) Inventors: Alden C. Russell, Minnetonka, MN (US); Alan R. Dewey, Plymouth, MN (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 465 days.

(21) Appl. No.: 11/974,418

(22) Filed: Oct. 12, 2007

(65) Prior Publication Data
US 2008/0091376 A1 Apr. 17, 2008

Related U.S. Application Data

(60) Provisional application No. 60/851,623, filed on Oct. 13, 2006.

(51) Int. Cl.
*G01D 18/00* (2006.01)
*G01D 21/00* (2006.01)
*G01C 25/00* (2006.01)
*G06F 19/00* (2006.01)

(52) U.S. Cl. ........... 702/85; 702/104; 702/116; 702/122
(58) Field of Classification Search .................... 702/85, 702/86–108, 116, 121–123
See application file for complete search history.

(56) References Cited

U.S. PATENT DOCUMENTS

| | | | |
|---|---|---|---|
| 5,442,639 A | 8/1995 | Crowder et al. | ............. 371/20.1 |
| 5,796,602 A | 8/1998 | Wellan et al. | |
| 6,211,649 B1 | 4/2001 | Matsuda | ........................ 320/115 |
| 6,377,859 B1 | 4/2002 | Brown et al. | ................... 700/79 |
| 6,957,133 B1 | 10/2005 | Hunt et al. | |
| 6,963,814 B2 * | 11/2005 | Jones et al. | ................... 702/119 |
| 7,027,952 B2 | 4/2006 | DelaCruz et al. | |
| 7,262,693 B2 * | 8/2007 | Karschnia et al. | ............ 340/508 |
| 7,421,531 B2 | 9/2008 | Rotvold et al. | ............... 710/305 |
| 2002/0167904 A1 | 11/2002 | Borgeson et al. | ............. 370/241 |
| 2003/0109937 A1 * | 6/2003 | Zielinski et al. | ................... 700/1 |
| 2004/0016457 A1 * | 1/2004 | Bolland | ........................ 137/391 |
| 2004/0073402 A1 * | 4/2004 | DelaCruz et al. | ............. 702/183 |
| 2004/0111238 A1 | 6/2004 | Kantzes et al. | ............... 702/183 |
| 2004/0228184 A1 | 11/2004 | Mathiowetz | ................... 365/202 |
| 2004/0230327 A1 | 11/2004 | Opheim et al. | ................... 700/83 |
| 2004/0249592 A1 * | 12/2004 | Koukol et al. | ................... 702/88 |
| 2005/0114086 A1 * | 5/2005 | Zielinski et al. | ............... 702/184 |

(Continued)

FOREIGN PATENT DOCUMENTS

| | | |
|---|---|---|
| GB | 2 394 124 | 4/2004 |
| JP | 2003018043 | 1/2003 |

(Continued)

OTHER PUBLICATIONS

Search report of European Patent Office in Patent Application PCT/US2007/021844 filed Dec. 10, 2007.

(Continued)

*Primary Examiner* — Cindy Hien-Dieu Khuu
*Assistant Examiner* — Ricky Ngon
(74) *Attorney, Agent, or Firm* — Christopher R. Christenson; Westman, Champlin & Kelly, P.A.

(57) ABSTRACT

A calibrator for field devices is provided. In one aspect, the calibrator has the ability to communicate in accordance with at least two process communication protocols, and tests an attached process connection before engaging communication. In another aspect, the calibrator includes isolation circuitry to facilitate compliance with at least one intrinsic safety requirement, while communicating with field devices using an all-digital process communication protocol. In another aspect, a method of calibrating field devices is provided which accesses device descriptions of the field devices to generate calibration tasks.

10 Claims, 7 Drawing Sheets

U.S. PATENT DOCUMENTS

| | | | |
|---|---|---|---|
| 2005/0288799 A1* | 12/2005 | Brewer et al. | 700/1 |
| 2006/0282580 A1* | 12/2006 | Russell et al. | 710/62 |
| 2006/0291438 A1 | 12/2006 | Karschnia et al. | 370/338 |
| 2008/0114911 A1 | 5/2008 | Schumacher | 710/72 |

FOREIGN PATENT DOCUMENTS

| | | |
|---|---|---|
| JP | 2003215112 | 7/2003 |
| WO | WO 2006/053211 | 5/2006 |
| WO | WO 2009/003146 | 12/2008 |
| WO | WO 2009/003148 | 12/2008 |

OTHER PUBLICATIONS

Dewey, A. R., "Fieldbus Device Maintenance—Do I Need to Go to the Field Anymore?" ISA—The instrumentation, Systems and Automation Society, 2000.

"HART Transmitter Calibration," Fluke Corporation, 1999.

"MCT202 Technical datasheet," econ Instruments.

"Introducing the world's first fieldbus calibrator. MC5 Fieldbus Calibrator," Beamex, Inc., 2006.

First Communication for European patent application No. 07839501.9 dated Jul. 14, 2010.

First Office Action for Chinese patent application No. 200780038026.3 dated Jul. 5, 2010.

First Office Action for Japanese patent application No. 2009532435 dated Oct. 25, 2011.

Technical Data Sheet: VIATOR® USB HART® Interface (Model 010031). MACTek Measurement and Control Technologies.

VIATOR® Bluetooth® Wireless Technology Interface for use with HART field devices. MACTek Measurement and Control Technologies retrieved from www.mactekcorp.com/product5.htm.

Product Data Sheet: VIATOR RS232. MACTek Measurement and Control Technologies retrieved from www.mactekcorp.com/product1.htm.

* cited by examiner

FIELD DEVICE CALIBRATION

CROSS-REFERENCE TO RELATED APPLICATION

The present application is based on and claims the benefit of U.S. provisional patent application Ser. No. 60/851,623, filed Oct. 13, 2006, the content of which is hereby incorporated by reference in its entirety.

BACKGROUND OF THE INVENTION

In industrial settings, control systems are used to monitor and control inventories of industrial and chemical processes, and the like. Typically, the control system performs these functions using field devices distributed at key locations in the industrial process and coupled to the control circuitry in the control room by control loop. The term "field device" refers to any device that performs a function in a distributed control or process monitoring system, including all devices used in the measurement, control and monitoring of industrial processes.

Field devices are used by the process control and measurement industry for a variety of purposes. Usually, such field devices have a field-hardened enclosure so that they can be installed outdoors in relatively rugged environments and able to withstand climatological extremes of temperature, humidity, vibration, mechanical shock, et cetera. These field devices also can typically operate on relatively low power. For example, field devices are currently available that receive all of their operating power from a known 4-20 mA loop.

Some field devices include a transducer. A transducer is understood to mean either a device that generates an output signal based on a physical input or that generates a physical output based on an input signal. Typically, a transducer transforms an input signal into an output having a different form. Types of transducers include various analytical equipment, pressure sensors, thermistors, thermocouples, strain gauges, flow transmitters, positioners, actuators, solenoids, indicator lights, and others.

Analog field devices have been connected to the control room by two-wire process control current loops, with each device typically connected to the control room by a single two-wire control loop. Typically, a voltage differential is maintained between the two wires within a range from about 12-45 volts. Some analog field devices transmit a signal to the control room by modulating the current running through the current loop to a current proportional to the sensed process variable. Other analog field devices can perform an action based upon a magnitude of a current signal set by a control room and flowing through the loop.

In addition to, or in the alternative, the process control loop can carry digital signals used for communication with field devices. Digital communication provides much more detail about the connected device than analog communication. Moreover, digital field devices also do not require separate wiring for each such field device. Field devices that communicate digitally can respond to and communicate selectively with the control room and/or other field devices. Further, such devices can provide additional signaling such as diagnostics and/or alarms.

Known process communication methods include simply using a 4-20 mA analog communication loop, hybrid protocols, such as the Highway Addressable Remote Transducer (HART®) standard, or all-digital protocols such as the FOUNDATION™ fieldbus standard.

Over time, physical elements within, or connected to, a process device may change and/or age. These changes can be due to exposure of the field device to external forces such as temperature or pressure extremes, corrosion, et cetera. Thus, it is necessary, from time to time, to calibrate field devices. This is often accomplished using a calibrator. The calibrator steps the maintenance technician through a series of steps which involve applying a known physical input (e.g. pressure, temperature, et cetera) and then recording the value that the field device outputs in response to the known physical input. Some known calibrators can accept the download of a "route" from an asset management system. This route lists the field devices that are to be calibrated and the steps that are to be performed for each device. At the end of the route, all of calibration data acquired by the calibrator for the field devices can be uploaded back into an asset management system. Using this process ensures complete, accurate documentation of all calibration activity associated with each field device. Calibrators that acquire data relative to calibrations, and temporarily store such data for later upload to an asset management system are known as documenting calibrators.

SUMMARY

A calibrator for field devices is provided. In one aspect, the calibrator has the ability to communicate in accordance with at least two process communication protocols, and tests an attached process connection before engaging communication. In another aspect, the calibrator includes isolation circuitry to facilitate compliance with at least one intrinsic safety requirement, while communicating with field devices using an all-digital process communication protocol. In another aspect, a method of calibrating field devices is provided which accesses device descriptions of the field devices to generate calibration tasks.

DETAILED DESCRIPTION OF ILLUSTRATIVE EMBODIMENTS

Figure 1:
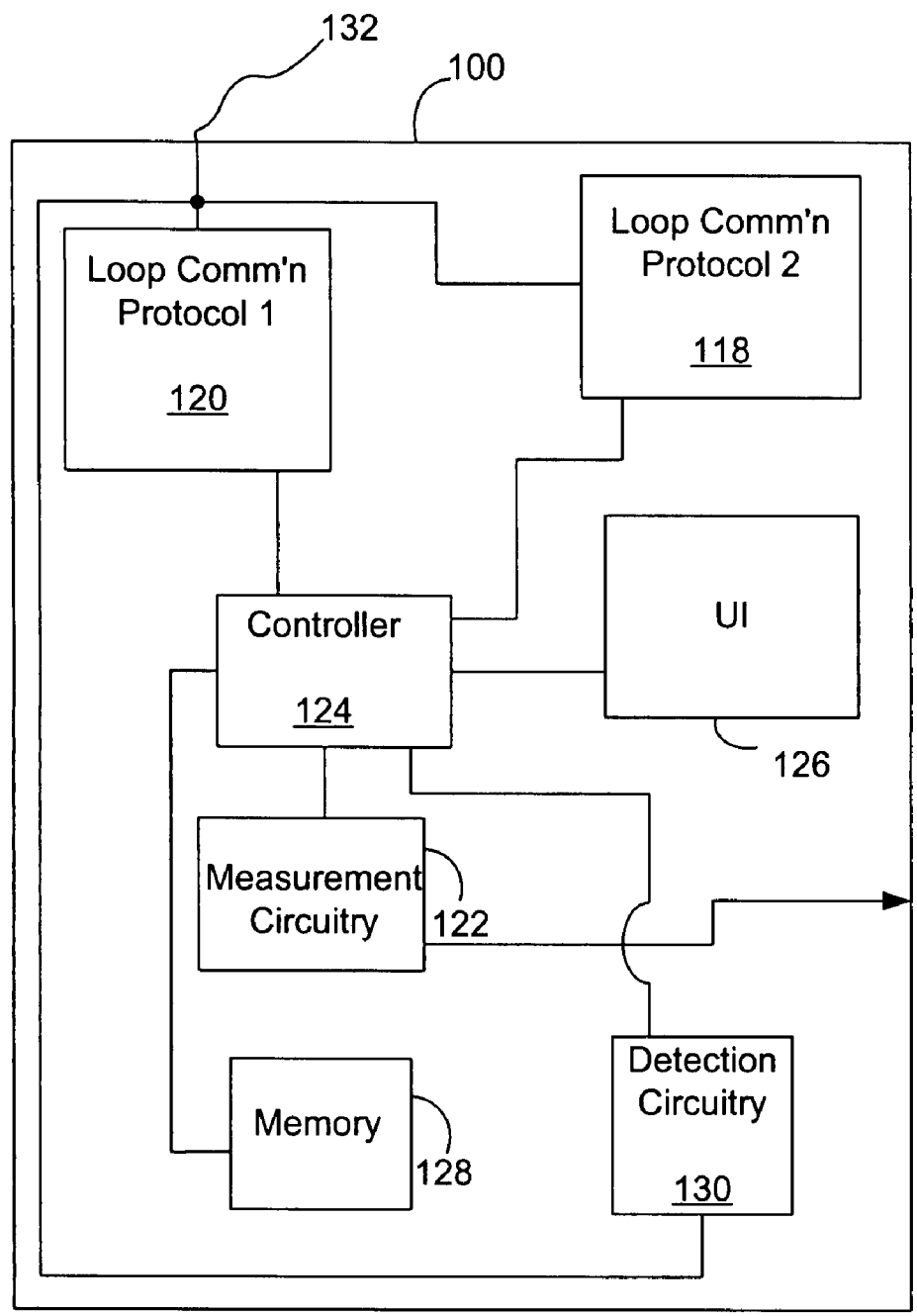
FIG. 1 is a diagrammatic view of a calibrator in accordance with an embodiment of the present invention.

FIG. 1 is a diagrammatic view of calibrator 100 in accordance with an embodiment of the present invention. Calibrator 100 includes all-digital loop communication module 120 and secondary loop communication module 118, both of which are coupled to controller 124. Secondary communication module 118 can be a communication module allowing calibrator 100 to communicate in accordance with a different process communication protocol than that provided by module 120. For example, if module 120 provides communication in accordance with the FOUNDATION™ Fieldbus process communication protocol, module 118 can provide communication in accordance with a different protocol, such as the Highway Addressable Remote Transducer (HART®) protocol, or some other suitable protocol. Examples of known all-digital communications protocols that are used in the process control and measurement industry include FOUNDATION™ Fieldbus; Profibus-PA; FOUNDATION Fieldbus™ High Speed Ethernet (HSE); and IEC/ISASP50-compliant fieldbuses. Typically, communication chips are known for each type of all-digital process communication protocol. In accordance with an embodiment of the present invention, calibrator 100 is provided with two or more distinct loop communication modules for communication in accordance with different process communication protocols. Further, secondary loop communication module 118 can include communication in accordance with the protocol to provide the functions of prior art calibrators. Additionally, since calibrator 100 can be used to calibrate field devices of different process communication types, it is further contemplated that when a given calibration route is downloaded into memory 128 of field device 100, that such calibration route expressly include an indication, for each field device tag, of the process communication type suitable for that field device. Thus, the technician making the field device run need not remember which field devices communicate in which protocols, but calibrator 100 can automatically change its communication type depending on the device tag of the field device under calibration. Additionally, or alternatively, the calibrator can provide an indication of process communication type to the technician who can then agree with or override the indication as appropriate.

Controller 124 is preferably a microprocessor, or some other form of circuitry that is able to execute programmatic instructions to perform programmed tasks. Controller 124 is coupled to user interface 126 and to measurement circuitry 122. Additionally, controller 124 is also coupled to memory 128 allowing calibrator 100 to store, or otherwise document, calibration information.

In accordance with one embodiment of the present invention, calibrator 100 tests the loop type of a process communication loop to which it is coupled, or a communication type of a field device to which it is coupled, to ensure that the anticipated communication type agrees with the device or loop to which calibrator 100 is connected. Thus, if the field maintenance technician should inadvertently couple calibrator 100 to the wrong field device, erroneous data transmissions using incompatible process communications can be detected and/or prevented.

Detection circuitry 130 is coupled to controller 124, as well as process loop connection 132. Detection circuitry 130 includes suitable circuitry to sense voltage across, or current passing through, terminals of process loop or field device connection 132.

Methods for determining which type of wired process communication protocol a device is coupled to are known. Specifically, U.S. Pat. No. 7,027,952 B2 teaches a data transmission method for a multi-protocol handheld field maintenance tool. Accordingly, detection circuitry 130 may include a circuit that can sink a small amplitude, short duration current across the process communication terminals. The detection circuitry can further include circuitry to measure DC voltage, communications signal amplitude, as well as include appropriate signal conditioning circuitry. If controller 124, by virtue of connection 132 measures a non-zero voltage, controller 124 first determines the magnitude of the voltage. A HART® process control loop will cause a voltage between approximately 12 and 50 volts DC to be measured, while a FOUNDATION™ Fieldbus loop connection will cause a voltage between approximately 9 and 32 volts D/C to be measured. Once a DC voltage is recognized, the polarity is measured to determine whether the terminals of connection 132 are coupled with correct polarity. If the polarity is incorrect, a suitable indication, via user interface 126, is generated. However, for HART® connections, polarity does not matter.

As indicated above, there is an overlap between the operating DC voltages used on both HART® and Fieldbus process communication loops. Therefore, DC voltage alone cannot be used to reliably indicate the type of process communication terminals to which calibrator 100 is connected. To determine the loop type for connection 132, detection circuitry 130 measures the DC impedance of the connection. Circuitry 130 measure DC impedance by preferably sinking one milliamp of current for a short duration, such as 5 milliseconds. This disturbance generates a voltage pulse that is proportional to the DC impedance of the wired connection itself. There is a distinguishing range of impedance between HART® and FOUNDATION™ Fieldbus process connections. Additionally, or alternatively, in embodiments where yet a different wired process communication protocol is employed, various techniques for measuring and disambiguating the loop protocol type are contemplated. If the detected communication protocol type accords with the type of wired process communication for which the loop communication module is designed, then operation begins normally. However, if they do not match, a suitable indication is generated.

While FIG. 1 illustrates calibrator 100 having at least one all-digital loop communication module 120, and an additional communication module 118, it is contemplated that any suitable number of communication modules can be employed. Preferably, a single communication module is selected by controller 124 based on the anticipated communication type of a given field device and/or testing of process communication signals.

Figure 2:
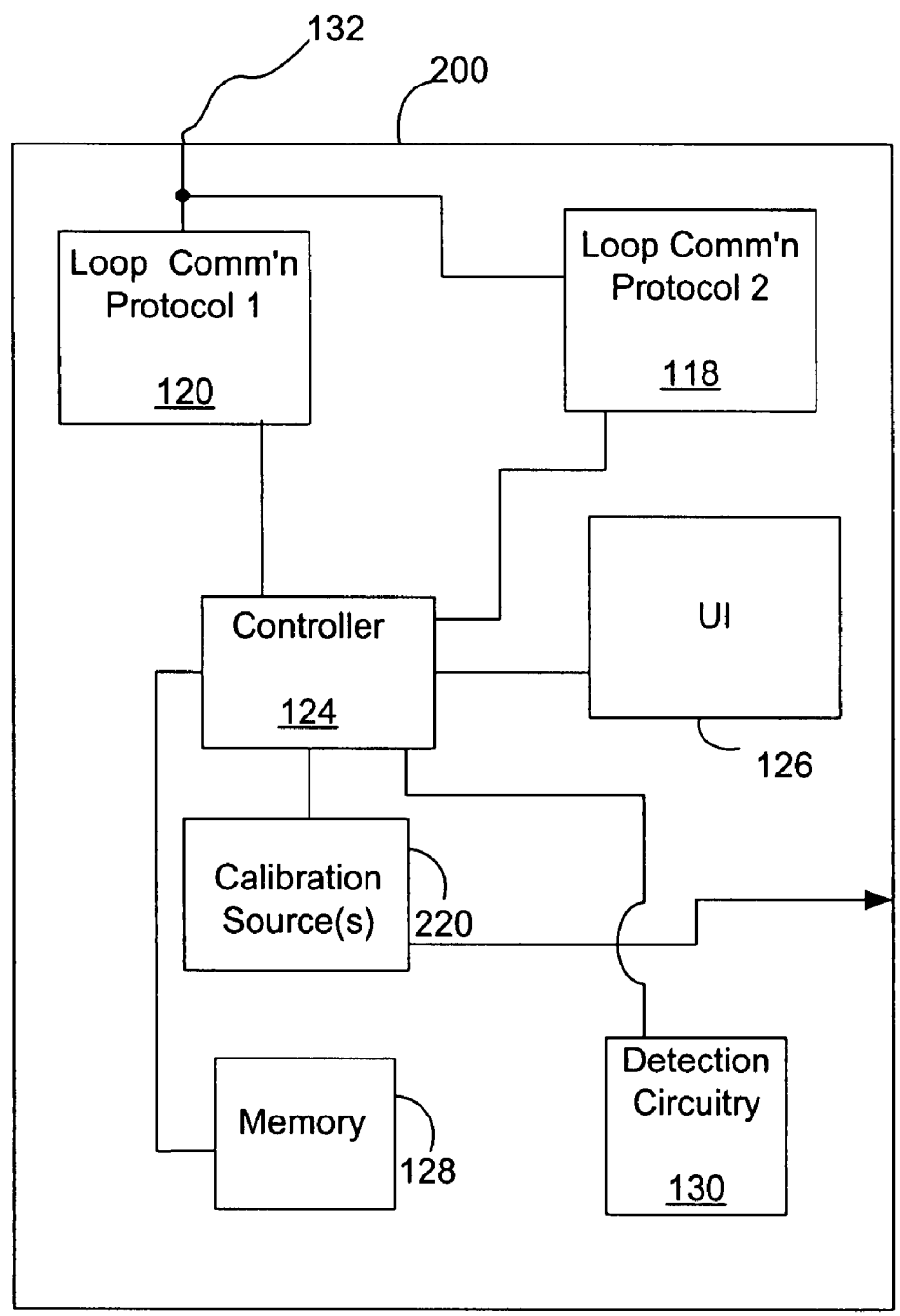
FIG. 2 is a diagrammatic view of calibrator in accordance with another embodiment of the present invention.

FIG. 2 is a diagrammatic view of a calibrator in accordance with an embodiment of the present invention. Various elements shown in FIG. 2 can be the same as those shown in FIG. 1, and like components are numbered similarly. The primary distinction between calibrator 100 (illustrated with respect to FIG. 1) and calibrator 200 (illustrated with respect to FIG. 2) is that calibrator 200 does not include measurement circuitry. Instead, calibrator 200 includes built in calibration source(s) 220. Controller 124 is coupled directly to calibration source(s) 220, and via programmatic instructions, or signals, causes source 220 to generate suitable calibration outputs to an attached field device as part of a calibration routine. Examples of calibration outputs can include providing a specific millivolt output to mimic, or otherwise simulate a temperature sensor, such as a thermocouple; providing, or otherwise coupling, a specific resistance output to mimic, or otherwise simulate a resistance-based sensor, such as an RTD, or strain gauge based pressure sensor; and/or providing a specific pressure output to test a pressure sensor, or other suitable outputs. Certainly, the greater the variety of outputs provided by source(s) 220, the larger the physical device will be, which will add weight to the overall equipment that must still be carried by the field technician.

Figure 3:
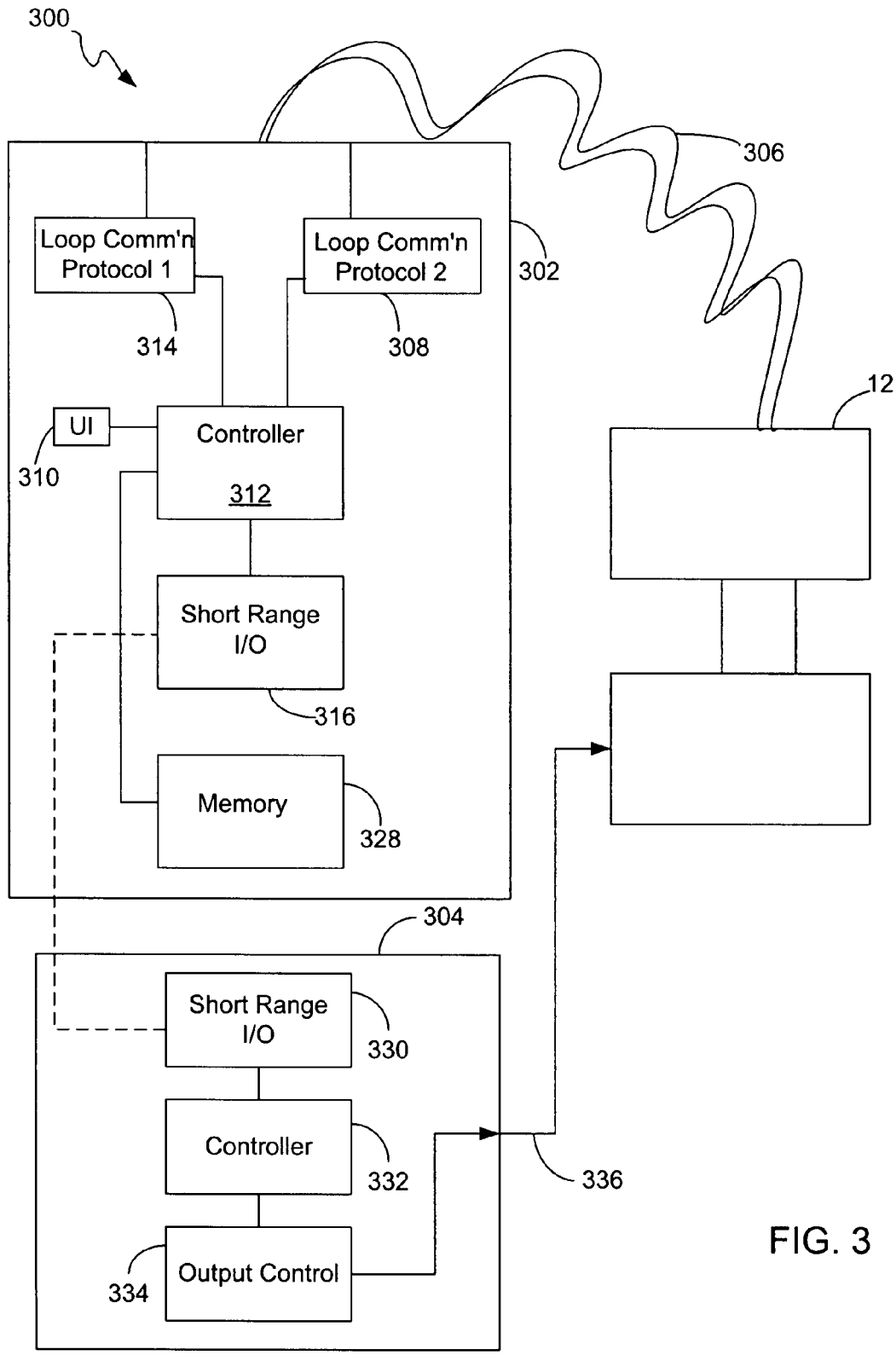
FIG. 3 is a diagrammatic view of a calibration system in accordance with an embodiment of the present invention.

FIG. 3 is a diagrammatic view of calibration system 300 in accordance with another embodiment of the present invention. Calibration system 300 includes calibrator 302 and universal calibration source 304. System 300 is operably coupled to an exemplary field device 12 by virtue of a connection 306 between field device 12 and loop communication module 308 or module 314 of calibrator 302. As illustrated in FIG. 3, calibrator 302 preferably includes a plurality of loop communication modules in order to couple to and communicate over multiple different types of process communication loops, or with field devices that communicate in accordance with different types of process communication protocols. Calibrator 302 includes user interface 310, which preferably includes a display and input mechanism, such as a keypad. Calibrator 302 further includes controller 312 that is coupled to loop communication modules 314 and 308. Additionally, controller 312 is also coupled to short-range wireless input/output module 316 and to memory 328. Memory 328 allows controller 312 to maintain, or otherwise document, information obtained during one or more calibrations. This information can later be uploaded to a suitable asset management system, as appropriate, such as AMS™ Suite: Intelligent Device Manager, available from Fisher-Rosemount Systems, Inc. of Austin, Tex. Suitable wireless short-range I/O modules include those that communicate using, for example, optical or radio-frequency communication. Suitable examples of radio-frequency communication include the known Bluetooth radio-frequency communication, as well as wireless Fidelity (WIFI) communication in accordance with IEEE 802.11b or IEEE 802.11g. Certainly, other relatively short-range radio-frequency communications that may be developed in the future can be used for short-range input/output module 216.

Universal calibration source 304 includes a wireless short-range input/output module 330 configured to interact with short-range input/output module 316 of calibrator 302. Additionally, source 304 includes controller 332 that is configured to communicate with controller 312 via short-range I/O module 330. Preferably, controller 332 is a microprocessor. Controller 332 is also coupled to output control module 334 which is configured to generate one or more known physical signals based upon instructions from controller 332. Output control module 334 can include one or more multiplexers and/or suitable switches to engage electrical outputs, such as known resistances, or known voltages. Additionally, output control module 334 can be configured to generate one or more known physical signals such as pressures. While source 304 illustrates output control module 334 providing an output along line 336, in reality, a number of terminals and/or ports may be provided on source 304 in order to couple the various outputs, electrically, fluidically, or otherwise, to a field device for calibration. System 300 provides a wide array of flexibility in calibrating field devices in that communication with field devices, including both all-digital communication-based field devices as well as hybrid communication field devices can be done using the respective communication modules within calibrator 302. Additionally, any suitable known physical outputs can be provided by source 304 based upon instructions received by source 304 from calibrator 302. In this manner, calibration of a HART®-based process pressure transmitter can be calibrated using system 300, and then the very next field device to be calibrated can be a FOUNDATION™ Fieldbus-based process pressure transmitter. The communication adaptation is easily accommodated using the different communication modules, while source 304 provides the suitable known physical inputs to the various field devices in accordance with instructions received from calibrator 302.

Figure 4:
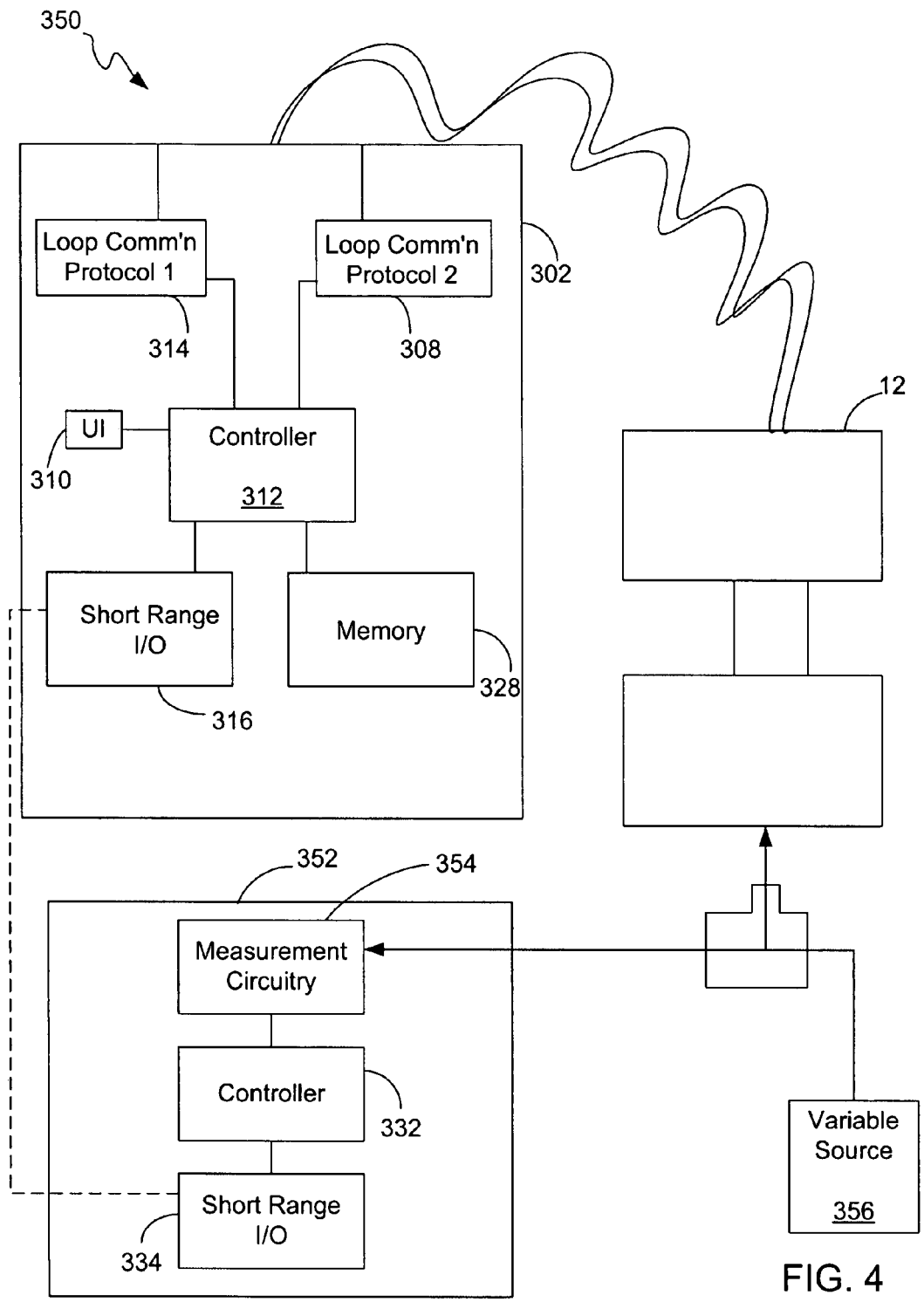
FIG. 4 is a diagrammatic view of a calibration system in accordance with another embodiment of the present invention.

FIG. 4 is a diagrammatic view of calibration system 350 in accordance with another embodiment of the present invention. Calibration system 350 includes calibrator 302, which may be identical to that illustrated with respect to FIG. 3. However, instead of system 350 using source 304, system 350 employs one or more calibrated measurement modules 352. Measurement module 352 includes measurement circuitry 354 which may include one or more suitable analog-to-digital converters. Additionally, measurement circuitry 354 is itself periodically calibrated to a known physical input such that device 352 can be relied upon to provide an accurate indication of a particular variable source. Measurement module 352 also preferably includes controller 332, which may be a microprocessor, coupled to wireless short-range I/O module 334. Utilization of module 352 allows calibration to be provided with essentially variable sources, but the variable physical input is accurately transduced, or otherwise measured, by module 352 and such measurement is communicated to calibrator 302 via communication between wireless short-range I/O modules 334 and 316. In this manner, one or more measurement modules 352 can be used with various variable physical inputs to provide calibration for field device 12. Calibration of field device 12 using system 350 takes the form of calibrator 302 instructing the field maintenance technician to apply a particular physical input, such as "Apply medium-range pressure." The technician then engages variable source 356 to provide a relatively medium-range pressure to field device 12, and to measurement circuitry 354 of module 352. Circuitry 354 senses the pressure using its own pressure sensor and analog-to-digital converter, and provides an accurate, calibrated, indication of the variable pressure measurement to controller 332. Controller 332 then communicates the measured pressure to calibrator 302 via wireless short-range I/O module 334. Calibrator 302 receives the indication of the applied pressure from module 352, and also interrogates field device 12 to provide its own measured value relative to the variable source through loop communication module 308. Depending on whether the two values agree sufficiently, change can be effected on field device 12 either by instructing the field maintenance technician to make a particular adjustment, or by communicating digitally with field device 12 over the process communication loop. In any event, the results of the calibration are preferably stored in memory 328 allowing calibrator 302 to function as a documenting calibrator. It is contemplated that a variety of modules 352 can be used for a variety of different physical inputs. For example, one module 352 may be configured to sense resistances, while another module 352 may be configured to sense voltages. Still another module 352 may be configured to sense pressures, et cetera.

Figure 5:
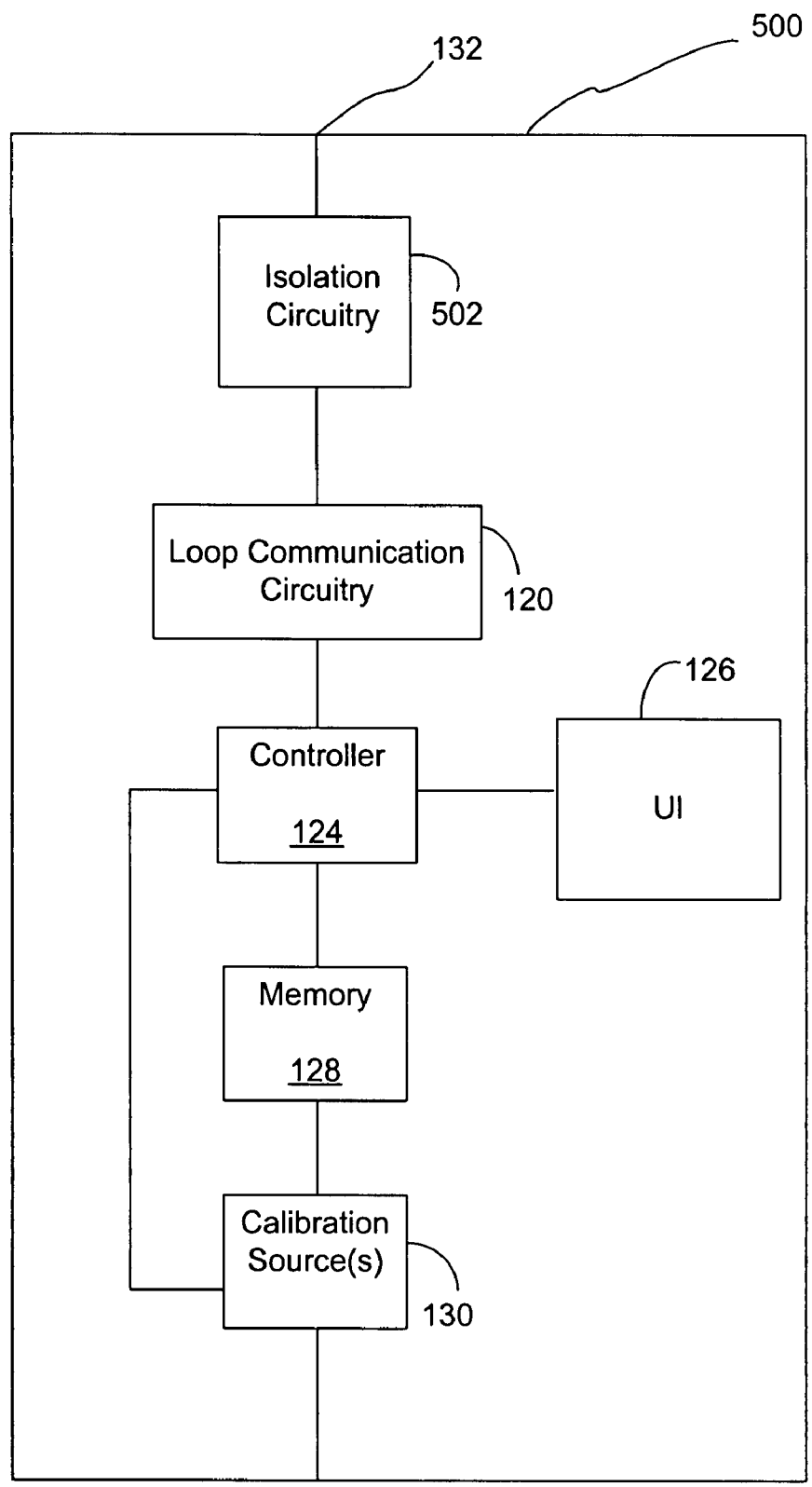
FIG. 5 is a diagrammatic view of a calibrator in accordance with another embodiment of the present invention.

In accordance with another embodiment of the present invention, a calibrator is configured to comply with an intrinsic safety requirement and communicate in accordance with at least one all-digital process communication protocol. Specifically, the calibrator employs circuitry, and design constraints that comply with, for example, APPROVAL STANDARD INTRINSICALLY SAFE APPARATUS AND ASSOCIATED APPARATUS FOR USE IN CLASS I, II, AND III, DIVISION 1 HAZARD (CLASSIFIED) LOCATIONS, CLASS 3610, PROMULGATED BY FACTORY MUTUAL RESEARCH OCTOBER, 1988. Other standards include CSA and CENELEC. Compliance with this specification helps ensure that when the calibrator is present in highly volatile, or explosive environments, that it is less apt to generate a source of ignition for that environment. FIG. 5 is a diagrammatic view of an all-digital calibrator in accordance with an embodiment of the present invention. Calibrator 500 bears some similarities to calibrator 200 (described with respect to FIG. 2) and like components are numbered similarly. Calibrator 500 is illustrated including only a single loop communication module. However, additional modules to communicate in accordance with various other process communication protocols can be employed. Calibrator 500 includes isolation circuitry 502 that is interposed between loop communication circuitry 120 and process connection 132. Isolation circuitry 502 functions similarly to known intrinsic safety barriers in that it limits the amount of energy that can pass onto the process communication loop. Examples of such current limiting circuitry include the utilization of diodes, resistors, and/or capacitors, in suitable arrangements to inhibit the discharge of too much energy into the process communication loop. The utilization of isolation circuitry 502 helps facilitate compliance with one or more intrinsic safety requirements, such as those cited above. Additionally, calibrator 500 may have circuit board component and/or trace spacing requirements that facilitate compliance with at least one intrinsic safety requirement. Further, calibrator 500 can include power management circuitry and/or algorithms to further facilitate compliance with at least one intrinsic safety requirement. Thus, calibrator 500 is an intrinsically safe calibrator that is able to calibrate field devices that communicate solely digitally. One exemplary illustration of calibrator 500 is an intrinsically safe, FOUNDATION™ Fieldbus calibrator. Additionally, FIG. 5 illustrates calibrator 500 having one or more calibration sources 130 disposed within calibrator 500. However, it is also expressly contemplated that embodiments of the present invention can be practiced with calibrator 500 being operably coupled to one or more suitable calibration sources that may be external to calibrator 500.

Figure 6:
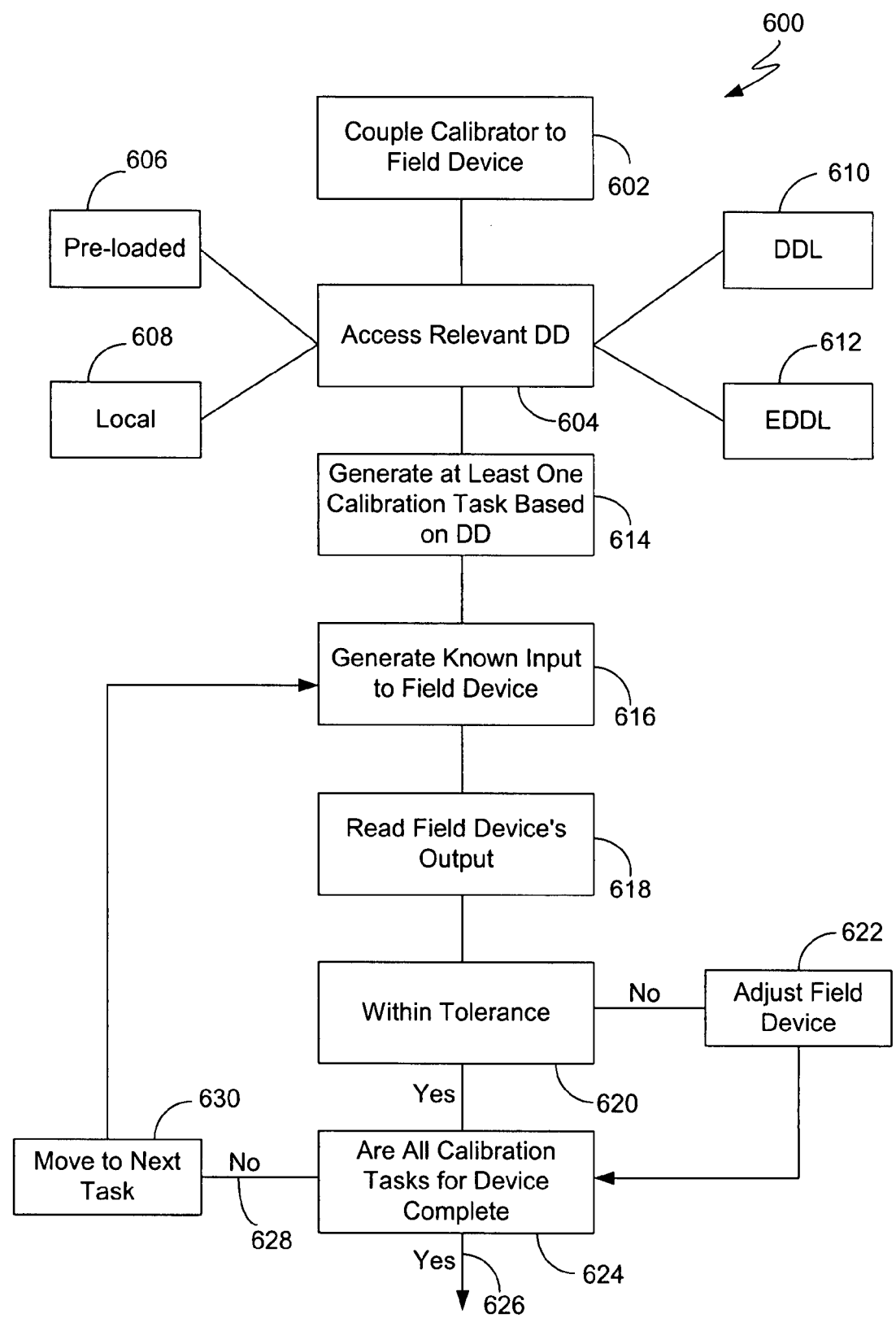
FIG. 6 is a flow diagram of a method of calibrating a field device in accordance with an embodiment of the present invention.

FIG. 6 is a flow diagram of a method of universal calibration based upon device descriptions in accordance with an embodiment of the present invention. Method 600 begins at block 602 where a calibrator is coupled to a field device. Such coupling can include the utilization of a multi-protocol calibrator as described above as well as utilizing the technique for safely determining the loop type of the connected process communication loop. However, block 602 can simply include coupling any calibrator to any field device. Next, at block 604, the relevant device description for the field device is accessed. The device description is a software technology used, to describe parameters in a field device in computer-readable format. This device description (DD) contains all of the information necessary for a software application being executed on the calibrator to retrieve and use data from the field device. Further information regarding device descriptions can be found in U.S. Pat. No. 5,796,602 assigned to Fisher-Rosemount Systems, Inc.

A device description is a file written in accordance with a communication protocol or a particular device description language (DDL) which specifies all of the information available about a particular type of field device. Device descriptions for smart devices typically specify five categories of information including: identification of the parameters and/or properties associated with the device, including the types of data, defining those parameters and/or properties (such as whether these parameters and/or properties are variables, arrays or records and the units associated with each); commands necessary for communication with the field device including information on how to send messages to and receive messages from the field device; user interface data such as pre-defined menus and displays which logically group parameter or property related data; methods or programs to be run by a host device in relation to the field device, including methods which provide information to a user in the form of instructions and/or which send messages to the field device to implement, for example, a calibration or other routine on the smart device; and utility information.

To develop a device description (DD) source file (written in human-readable format) for a field device, a developer uses the DDL for the communication protocol associated with that device to describe core or essential characteristics of the device as well as to provide group-specific, and vendor-specific definitions relating to each function and special feature of the field device, as defined by the above-identified categories of information. Thereafter, the developed DD source file may be compiled into a binary format to produce a machine-readable file or a DD object file using, for example, a tokenizer. Device description object files are typically provided to a user by the device manufacturer or third-party developers to be stored in a host system, such as a field device management system. Although device description language and device descriptions are generally known in the art, additional information pertaining to specific functions and formats of DDL's and the fieldbus DDL in particular, can be found in the InterOperable systems project foundation manual entitled "InterOperable System Project Fieldbus Specification Device Description Language" (1993). A similar document pertaining to the HART DDL is provided by the HART Communication Foundation.

More recently, electronic device description language (EDDL) has been developed and now standardized as IEC Standard 61804-3. The new EDDL is fully backward compatible to 1990. Device descriptions for more than 20 million compatible instruments are installed in the field and can be readily accessed.

At block 604, the relevant device description can be pre-loaded into the calibrator, such as prior to the field technician's excursion into the field, as indicated at block 606, or can be obtained once the calibrator is coupled to the field device. This situation is indicated at block 608. In this regard, the calibrator can obtain the device description either directly from the attached field device, or can identify the field device, via a tag, or other suitable information, such as a radio frequency identification (RFID) tag and subsequently access a database, via wireless communication through the internet, or another suitable network, to obtain the relevant device description. As illustrated at block 610, the device description can be that previously formed from the device description language (DDL), or can be the newer electronic device description language, as indicated at block 612. Once the device description is accessed, block 614 executes where at least one calibration task is generated by the calibrator based upon the device description. Thus, if the device description indicates that the field device is a process fluid pressure transmitter having a range from 0 to 1000 PSI, suitable calibration tasks generated by the calibrator might include a test with a 0 pressure, a test with a 500 PSI pressure, and a test with a 1000 PSI pressure. Additionally, block 614 can include the field technician specifying additional calibration tasks via user interface 126 (shown in FIG. 1). At block 616, the calibration of the field device begins. At block 616, a known input is generated to the field device. Control then passes to block 618 where the calibrator reads the field device's output related to the known input. Next, at block 620, it is determined whether the field device's measurement of the known input is within an acceptable tolerance. This step can be done either automatically via a program resident within the calibrator, or can be overridden or otherwise manually set, by the field technician. If the field device's measurement is not within tolerance, control passes to block 622 where the field device is adjusted by the technician. After block 622, control passes to block 624, which is where control passes if the field device's measurement was within tolerance. At block 624, it is determined whether all calibration tasks for the field device are complete. If so, control passes along line 626 and method 600 ends. However, if not all calibration tasks are complete, control passes along line 628 to block 630 which moves to the next task, and returns to block 616 to generate the next known input to the field device.

Figure 7:
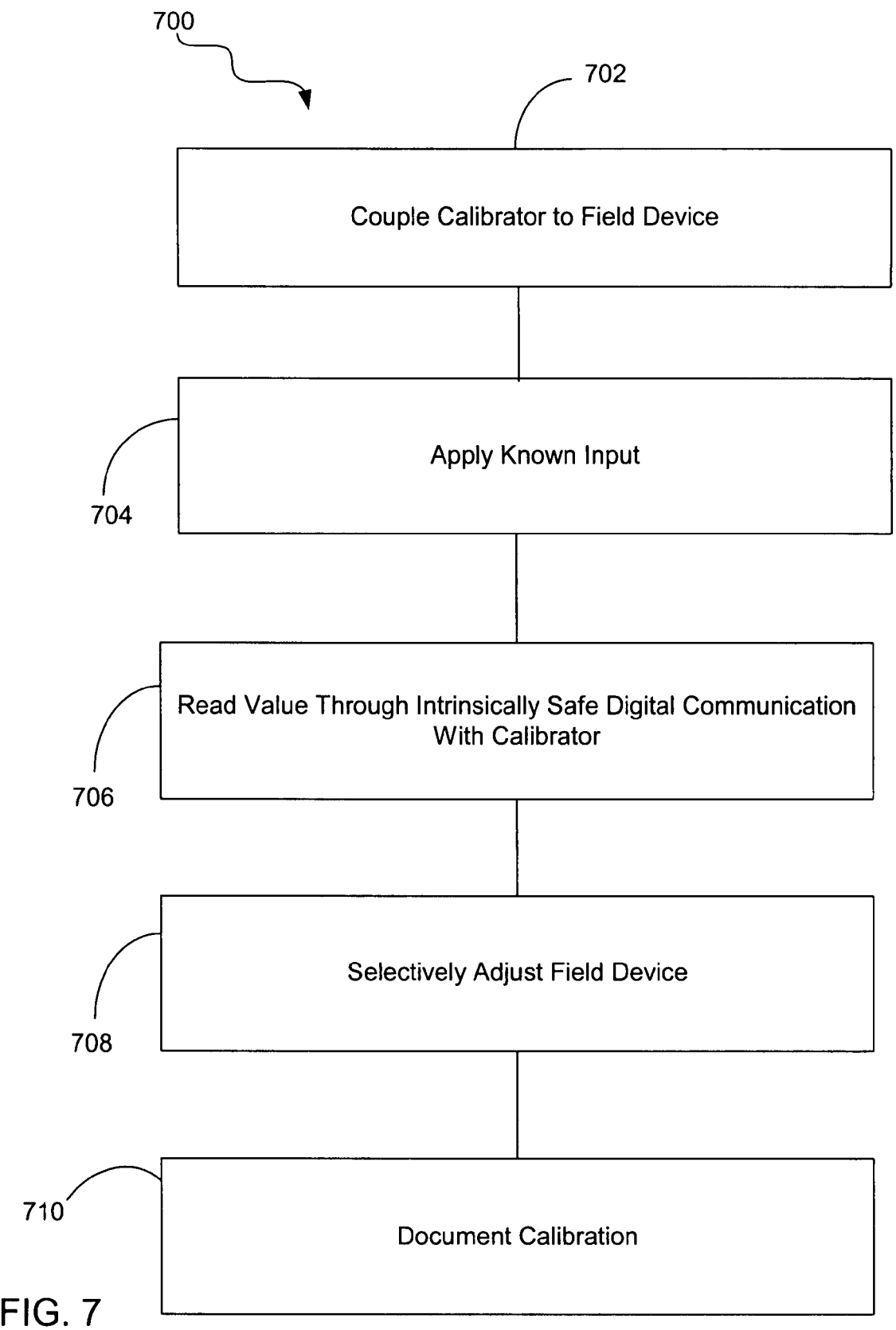
FIG. 7 is a flow diagram of another method of calibrating a field device in accordance with an embodiment of the present invention.

FIG. 7 is a flow diagram of a method of calibrating a field device in accordance with an embodiment of the present invention. Method 700 begins at block 702 where a calibrator is communicatively coupled to a field device for which calibration is desired. Next, at block 704, a known physical input is applied to the field device. Applying a known input can involve physically coupling a source of a known physical signal to the field device, or generating a relatively variable physical input, and measuring, or otherwise transducing, the magnitude of the variable with a calibrated, accurate, measurement module. Next, at block 706, a value corresponding to the known input is read from the field device under calibration using a calibrator communicating digitally in an intrinsically safe manner, as indicated at block 706. At block 708, the field device is selectively adjusted based upon the degree to which the field device accurately transduced the known physical input, as indicated at block 708. Selectively adjusting the field device may include instructing the field maintenance technician to perform one or more adjustments, or communicating digitally with the field device to generate the adjustment via software. Finally, at block 710, information relative to the calibration of the field device is stored. Examples of such information include: As Found/As Left data; the tag number of the field device; the time and date at which the calibration was performed; and/or the identity of the field maintenance technician who performed the calibration. Certainly other forms of data relevant to the calibration can also be stored.

When the calibration run is complete, the field maintenance technician will typically return to the control room of the process installation and upload the calibration data from the calibrator to an asset management system. In this way, field maintenance technicians can easily perform a vast array of calibrations relative to varying field devices and easily maintain such calibration information in an asset management system.

Although the present invention has been described with reference to preferred embodiments, workers skilled in the art will recognize that changes may be made in form and detail without departing from the spirit and scope of the invention.

What is claimed is:

1. A calibrator for calibrating a separate field device that only communicates digitally, the calibrator being separate from the field device and comprising:
    a first connection operably coupleable to the separate field device;
    a calibration source for generating a suitable calibration output through the first connection to the separate field device as part of a calibration routine;
    a second connection;
    isolation circuitry operably coupleable to the separate field device through the second connection;
    a loop communication module coupled to the isolation circuitry, the loop communication module being configured to communicate with the separate field device in accordance with at least one all-digital process communication protocol; and
    a controller coupled to the loop communication module, the controller being configured to communicate with and calibrate the separate field device through the loop communication module by automatically selectively generating an adjustment to the separate field device that is provided to the separate field device through the second connection.

2. The calibrator of claim 1, wherein the calibrator is intrinsically safe.

3. The field device of claim 1, and further comprising measurement circuitry coupled to at least one sensor to sense the known physical input.

4. The field device of claim 3, wherein the measurement circuitry includes an analog-to-digital converter.

5. A system for calibrating a separate field device, the system being separate from the field device and comprising:
    a calibrator including:
        a first connection operably coupleable to the separate field device;
        a loop communication module configured to communicate with the separate field device through the first connection in accordance with an all-digital process industry standard communication protocol;
        a controller operably coupled to the loop communication module, the controller being configured to communicate with and calibrate the separate field device through the loop communication circuitry by automatically selectively generating an adjustment to the separate field device;
        memory coupled to the controller and configured to store information relative to at least one calibration;
        short range wireless input/output communication circuitry; and
    a first universal source separate from the calibrator, the first universal source including:
        short range wireless input/output communication circuitry configured to communicate with the short range input/output communication circuitry of the calibrator;
        a controller coupled to the short range input/output communication circuitry; and
        an output control module coupled to the controller and configured to generate a physical output signal to the separate field device through a second connection based on an instruction from the controller.

6. The system of claim 5, and further comprising a second universal source.

7. A method of calibrating a field device, the method comprising:
    coupling a first connection of a calibrator to a field device that is separate from the calibrator;
    accessing a device description of the field device;
    generating at least one calibration task based upon the device description of the field device;
    executing the at least one calibration task by generating a known input to the field device through a second connection of the calibrator and automatically selectively generating an adjustment to the separate field device through the first connection of the calibrator;
    communicating with the field device to determine the field device's measurement corresponding to the known input; and
    determining if the field device's measurement is sufficiently close to the known value of the input.

8. The method of claim 7, wherein the device description is loaded into the calibrator prior to coupling the calibrator to the field device.

9. The method of claim 7, wherein the device description is an Electronic Device Description Language (EDDL) description.

10. The method of claim 7, wherein communicating with the field device is done completely digitally.

* * * * *